April 5, 1927.
J. G. McMAKIN
1,623,430
TROLLEY CONTROL
Filed March 23, 1925   2 Sheets-Sheet 1
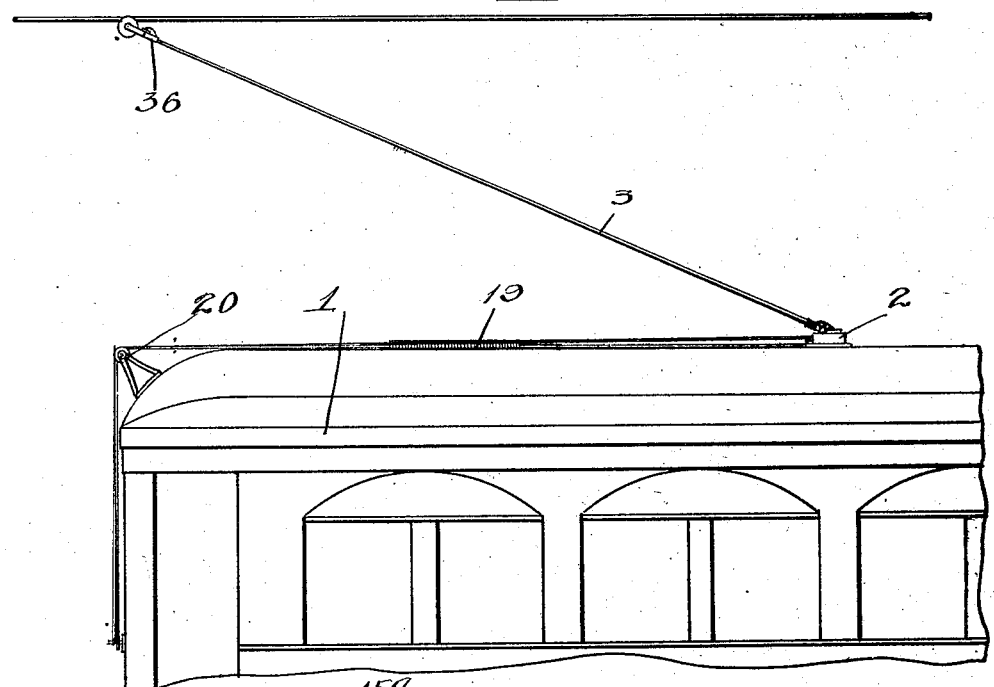
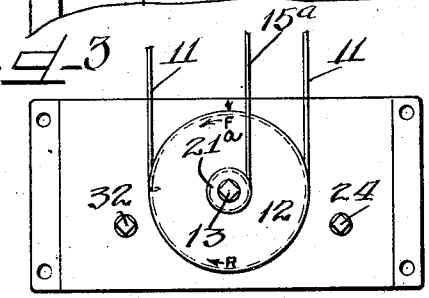
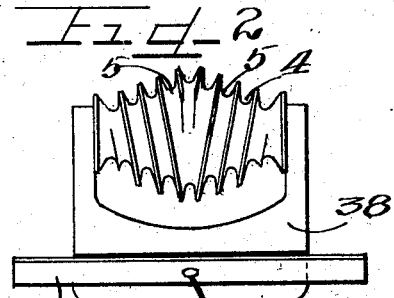
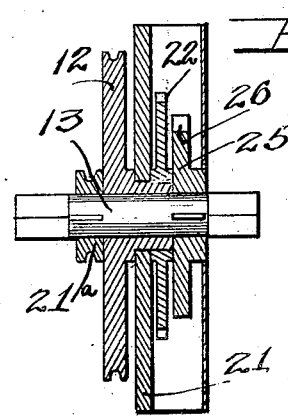
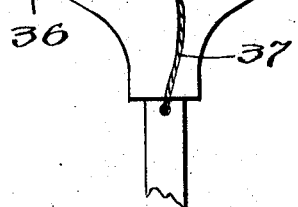
Inventor
Julius Grant McMakin
by Charles W. Hines
Attys.

April 5, 1927. 1,623,430
J. G. McMAKIN
TROLLEY CONTROL
Filed March 23, 1925  2 Sheets-Sheet 2
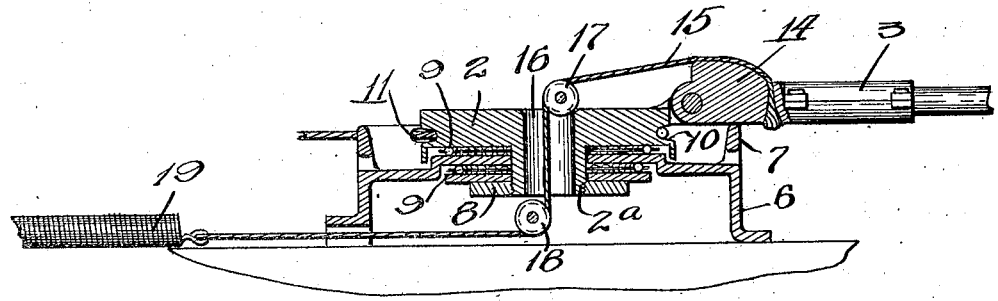
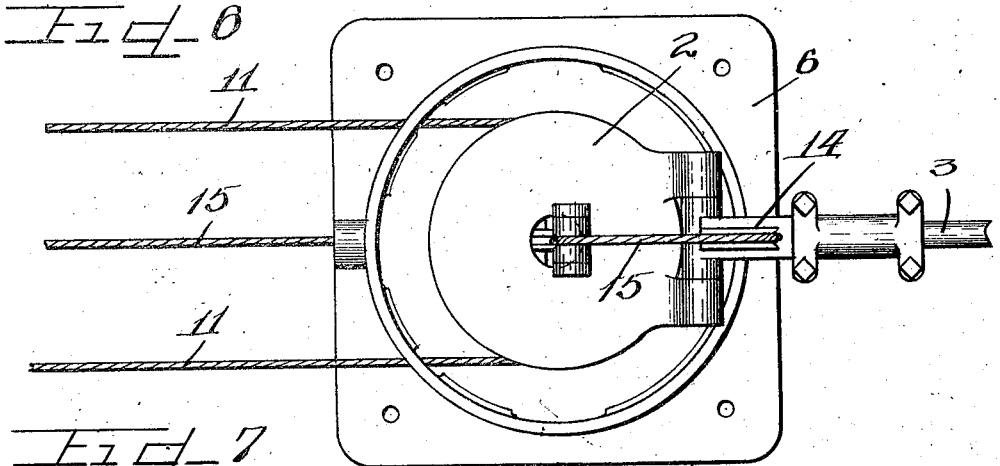
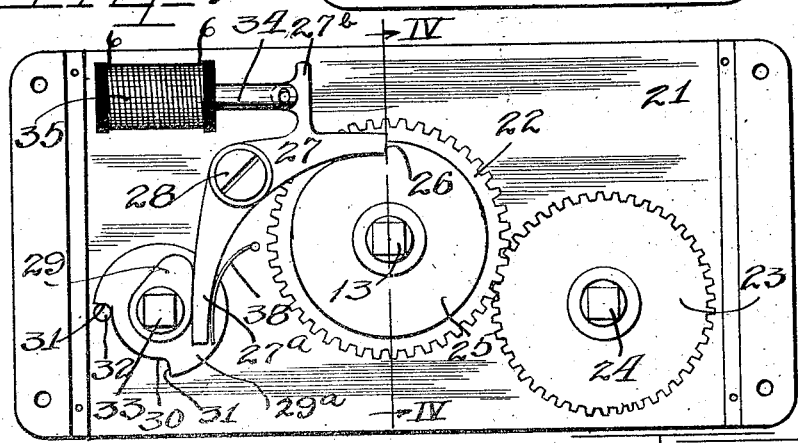

Patented Apr. 5, 1927.

1,623,430

UNITED STATES PATENT OFFICE.

JULIUS GRANT McMAKIN, OF CHICAGO, ILLINOIS.

TROLLEY CONTROL.

Application filed March 23, 1925. Serial No. 17,502.

This invention relates to a trolley rod control and concerns itself primarily with means for automatically releasing a trolley rod when it flies off its wire, and for readily replacing the same or guiding the same around corners by the operator within the car.

With these and other objects in view which will become more apparent in the following description and disclosures, this invention comprises the novel structure and combinations hereinafter described and more particularly pointed out and defined in the appended claims.

In the accompanying drawings which illustrate a preferred embodiment of this invention and in which similar reference numerals refer to similar features in the different views:

Figure 1 is a fragmentary elevational view of a street car equipped with my novel trolley control.

Figure 2 is an enlarged elevational view of the contact roller.

Figure 3 is an enlarged elevational view of the manual control for reversing the trolley rod.

Figure 4 is an enlarged fragmentary sectional view through the end of the car showing a part of the control mechanism taken upon the line IV—IV of Figure 6.

Figure 5 is an enlarged sectional view through the trolley rod support.

Figure 6 is an enlarged top plan view of the trolley rod support.

Figure 7 is an enlarged elevational view of part of the control mechanism.

As shown on the drawings:

Referring to the drawings, there is shown a fragmentary portion of a street car 1 having a cylindrical trolley rod support 2 upon its top, upon which a trolley rod 3 is pivoted. This trolley rod is provided upon its free end with a contact worm roller 4 which automatically centers itself through the grooves 5 which engage the contacting wire. This roller tapers toward its axis from the central portion so as to clear a cross wire.

In referring to the drawings, especially to Figures 5 and 6 it will be noted that the trolley rod is pivoted upon one side of the support 2, which in turn is swivelled in a bearing formed in a hollow stand 6 or the like, attached to the top of the car and having a flanged margin 7 for supporting the rod when it drops. In the present instance, the stand 6 is provided with a cylindrical bearing aperture through which a cylindrical hub 2ᵃ on the support extends. A nut 8 is attached to the lower end of the hub for retaining the same in position and antifriction thrust bearings 9 are disposed on opposite sides of the stand 6. A peripheral groove 10 is formed in the support 2 for receiving two operating cables 11, the ends of which are attached to the support 2, and to the pulley 12 (Figure 3) journalled upon the outer end of a stud 13 projecting through one end wall of the car.

The base of the trolley rod is provided with a substantially arcuate portion 14 provided with a groove for receiving a cable 15 which is suitably fastened to the rod 3 above its pivot point. This cable 15 extends through an axial opening 16 in the support 2 and is trained over suitable guide pulleys 17 and 18, the former carried by the support 2 adjacent the upper end of the opening 16, the latter being supported on the stationary stand 6. This cable is attached to one end of a coil spring 19. A cable 15ᵃ is attached to the other end of the spring 19 (Figure 3) and extends down over the end of the car which is provided with suitable guide pulleys 20 for the purpose, and is fastened to a small pulley 21ᵃ keyed upon the stud 13.

The hub of the pulley 12 extends through the end wall 21 of the car as shown in Figure 4. A gear 22 is keyed upon the inner end of said hub. A gear 23 (Figure 7) meshes with the gear 22 for the purpose of actuating the same. The gear 23 is secured upon a shaft 24 which extends through the front wall of the car, and both ends of this shaft are of polygonal form for receiving a wrench or crank whereby the gear 23 may be actuated either from within or without the car.

Keyed upon the shaft 13, adjacent the gear 22 is a disc 25 having a notch 26 adapted for receiving the end of a pawl 27 pivoted intermediate its ends by means of a pivot 28 to the end wall 21 of the car. This pawl has a depending tail 27ᵃ which is adapted to be engaged by a cam 29 formed integral with or fixed to a disk 29ᵃ having a peripheral cut out portion 30 forming terminal shoulders 31 for engagement with a stud 32 projecting from the end wall of the car for limiting the rotation of the cam, and holding the same in certain predetermined positions. The cam 29 and disk 29ª are secured upon a shaft 33 which extends through the end wall 21 of the car; both ends of said shaft being of polygonal form similar to the shaft 24 for receiving the same wrench or crank. The ends of the shaft 13 are also of similar polygonal form for receiving the same wrench or crank.

The upper portion of the pawl 27 is provided with an arm 27ᵇ to which the core 34 of a solenoid 35 is pivotally connected. This solenoid is connected with a bar 36 upon the upper end of the trolley rod through a conductor 37. The ends of the bar project beyond the ends of the roller frame 38 upon the upper end of the rod. Accordingly if the roller flies off the feed wire the bar 36 will come in contact therewith and energize the solenoid for withdrawing the pawl 27 and releasing the pulley 12 allowing the trolley rod to drop. A spring 38 (Figure 7) bears against the pawl for yieldingly retaining the same in operative position.

When it is desired to lower the trolley rod, the operator will apply his crank to either the outer or inner end of the shaft 33 and rotate the cam 29 for disengaging the pawl from the disk 25 whereby the trolley rod will automatically drop by gravity. In its lowered position, the trolley rod may be readily reversed by rotating the support 2 through a 180° by rotating the pulley 12 which may be manually done from without the car by grasping the pulley directly or may be done from within the car by rotating the gear 23 in the proper direction.

The trolley support 2 may also be rotated in the same manner in going around a curve or the like to maintain the roller in contact with the feed wire.

The trolley rod 3 may be elevated by rotating the shaft 13 and winding the cable 15ª upon the pulley 21ª as is obvious.

If the roller should fly off the wire, the rod 36 will come in contact with such wire and energize the solenoid 35 for retracting the pawl 27 whereby the trolley rod will be released and allowed to drop by gravity. In referring to Figure 7, it will be noted that the spring 38 normally tends to rotate the cam 29 in a counter-clock-wise direction, and that the upper shoulder 31 on the cam engages the stud 32 and limits such clockwise rotation. When the cam 29 is rotated in a clock-wise direction to release the pawl, the rotation of the cam will be limited by the opposite shoulder 31 engaging the stud 32.

From the foregoing, it will be appreciated that the operator may readily control the trolley rod from within or without the car and that mechanism has been provided for automatically releasing the rod if it flies off the wire.

I am aware that many changes may be made and numerous details of construction may be varied through a wide range without departing from the principles of this invention, and I therefore do not purpose limiting the patent granted hereon, otherwise than necessitated by the prior art.

I claim as my invention:

1. In a control of the class described, a support, a trolley rod pivoted upon said support, a cable for holding said rod in elevated position, a pulley for winding said cable to put it under supporting tension, a pawl for maintaining said pulley under tension, and a solenoid energized when said trolley rod leaves the wire for releasing said pawl to permit the trolley rod to drop.

2. In a control of the class described, a support, a trolley rod pivoted upon said support, a cable for holding said rod in elevated position, a pulley for winding said cable to put it under supporting tension, a pawl for maintaining said pulley under tension, a solenoid energized when said trolley rod leaves the wire for releasing said pawl to permit the trolley rod to drop, and manual means operable from the inside or the outside of the car for releasing said pawl.

3. In a device of the class described a bearing stand, a rotatable member on said stand, a trolley rod pivoted to said member and having a base with an arcuate portion, a cable attached to said rod and extending over said arcuate portion and through said rotatable member, and means for operating said cable.

4. The combination with a trolley car, of a rotatable support thereon, a trolley rod pivoted to said support, cables attached to said support, a cable attached to said trolley rod, and means operable from within or without the car for controlling said cables.

5. The combination with a trolley car, of a rotatable support thereon, a trolley rod pivoted to said support, and means operable from within or without the car for controlling said support and trolley rod.

In testimony whereof I have hereunto subscribed my name.

JULIUS GRANT McMAKIN.